UNITED STATES PATENT OFFICE.

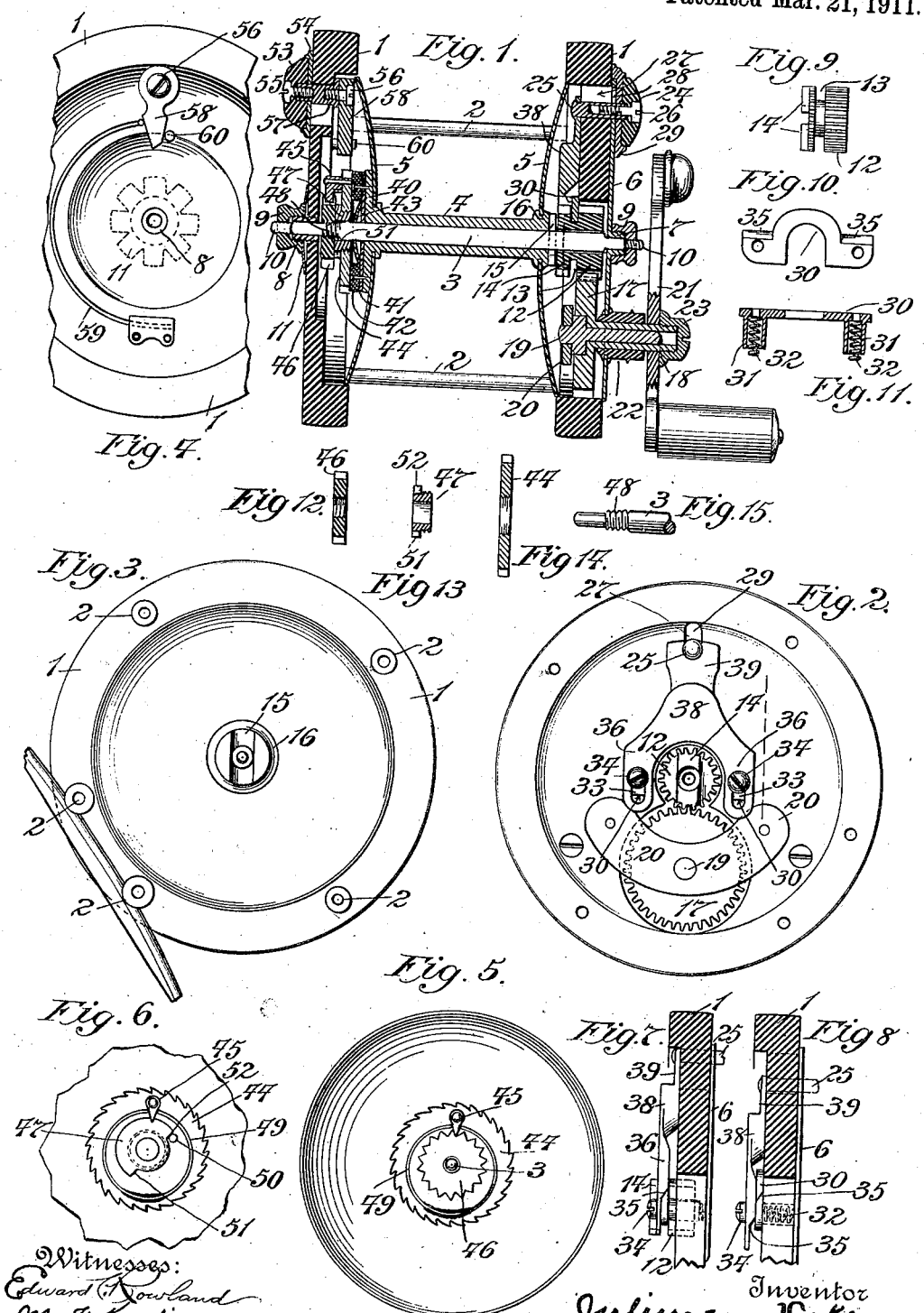

JULIUS VOM HOFE, OF NEW YORK, N. Y.

FISHING-REEL.

987,676.  Specification of Letters Patent.  Patented Mar. 21, 1911.

Original application filed September 11, 1909, Serial No. 517,270. Divided and this application filed September 12, 1910. Serial No. 581,630.

*To all whom it may concern:*

Be it known that I, JULIUS VOM HOFE, a citizen of the United States, and resident of New York, borough of Brooklyn, county of Kings, and State of New York, have made a new and useful Invention in Fishing-Reels, of which the following is a specification.

My invention is directed particularly to novel means for disconnecting the spool of a fishing reel from the driving gear thereof so as to allow the line to run free when casting, and also to novel means for varying the drag or braking effect in accordance with the strain put upon the line, when it is desired to apply such a brake.

My invention will be fully understood by referring to the accompanying drawings, in which, Figure 1 is a longitudinal sectional view of a reel illustrating my invention as applied thereto; and Fig. 2 is an interior end elevational view of one of the heads of the reel, illustrating the driving gear and a part of the means for effecting the connection and disconnection of said gear from the spool, the male portion of the sliding connecting mechanism being shown in this view. Fig. 3 is an end elevational view of the other head, the female part of the means for connecting and disconnecting the driving gear from the spool being shown and also the means for attaching the reel to the rod. Fig. 4 is an elevational view of the interior of one of the heads illustrating a part of the appliances which are utilized in connection with the braking means. Figs. 5 to 15 inclusive are detail views of various parts of the invention.

Referring now to the drawings in all of which like numerals represent like parts wherever used, 1, 1 represent the heads of the reel illustrated in this instance as of hard rubber, said heads being secured together in the usual way by a plurality of connecting rods or bars 2, 2, 2.

3 represents the rotary shaft of the spool journaled at its opposite ends in the heads, as will be described later on, and 4 the sleeve of the spool to which the line is to be attached.

5, 5, are the curvilinear metal heads of the spool secured to the enlarged heads of the sleeve 4 with their outer edges running in close proximity to the inner faces of the reel heads and adapted to support the line in the usual manner.

6 represents a metallic plate secured to the outer face of one of the heads and provided with an outwardly extending hollow externally screw-threaded part 7 which constitutes the journal bearing for the shaft 3 at one end and corresponds with the externally screw-threaded sleeve 8 constituting the journal bearing at the other end for said shaft, 9, 9, being internally screw-threaded caps, and 10, 10 adjusting screws for longitudinally adjusting the shaft in either direction.

11 represents a yielding spider washer adapted to act in such manner as to lock the left-hand cap 9 so as to prevent rotation thereof after proper adjustment is effected.

12 represents a driving pinion which is loosely and slidably journaled on the shaft 3 and is provided with a groove 13 and a male part 14 of a slidable connection for connecting the sleeve 4 of the spool to or disconnecting it from the operative parts of the reel through the agency of a female part 15 in the enlarged head 16 of said sleeve, the parts 14, 15 constituting in effect a sliding clutch.

17 represents the main driving gear, the teeth of which are always in mesh with the teeth of the pinion 12, said driving gear-wheel being cast integrally with a hollow driving shaft 18 journaled upon a stationary shaft 19 which is rigidly supported at one end at the center of a curvilinear bracket 20 secured to the inner faces of the head, the outer surface of the hollow shaft 18 being journaled within a tubular extension 22 rigidly secured in the plate 6, as shown.

21 represents the usual balanced driving crank of the reel which is secured to the outer end of the hollow shaft by an internally screw-threaded set-nut 23.

24 represents a slidable button and 25 a pin secured thereto by a screw 26 and extending through slots 27, 28 cut respectively in the head 1 and plate 6, 29 being a slidable metal seat located between the inner face of the button 24 and the plate 6.

38 represents a slidable arm operatively connected by an extension 39 to the inner end of the pin 25 and adapted to slide therewith. This arm 38 is provided with forked extensions 36, 36 each having a slot 33 at its free end.

30 represents a movable yoke or collar having a curvilinear central part adapted to fit loosely within the groove 13 in the pinion 12 (see Figs. 1, 9, 10 and 11.) This yoke is provided at its opposite ends with outwardly extending sleeves 31, 31 integral therewith and adapted to receive spiral springs 32, 32 having the proper internal diameter to receive the body parts of screws 34 adapted to slidably secure the yoke to the inner surface of the head of the reel (see Figs. 7, 8 and 11.)

35, 35, 35, 35 are oppositely inclined surfaces located respectively upon the yoke 30 and the under surface of the outer ends of the forked extensions 36.

Referring now to Figs. 1, 4, 5 and 6, 12, 13, 14 and 15, I will describe the details of my improvements relating to the drag or braking appliances. 40 represents one of the enlarged heads of the sleeve 4 to the outer face of which is secured a metal disk 41 and through which is secured by rivets a leather or equivalent friction ring or disk 42, constituting the yielding frictional part of the drag; 43 being a yielding spider washer the ends of the prongs of which rest against the disk 41 while the central or body portion thereof bears yieldingly against the inner end of a brake adjusting sector 47 (see Figs. 1, 6 and 13) connected to a ratchet-wheel 44 by a screw-threaded extension or neck. 45 is a click pivotally supported by the ratchet-wheel 44 and connected to a curvilinear spring 49 which is soldered to the ratchet-wheel 44 at its lower side, the free or clicking end of said click being adapted to give a continuous clicking noise when moved in either direction against the teeth of a click wheel 46 secured directly to the shaft 3 by a screw-thread 48. 50 is a check pin secured directly to the outer face of the ratchet wheel 44 and adapted to check a brake adjusting sector 47 when moved in either direction, as will be apparent on examination of Fig. 6. 51 and 52 are checking surfaces of the sector 47. It will be noted that the amount of braking force applied by the checking action of this pin 50 will depend upon the radial space between the checking surfaces 51, 52, and that I propose to provide each reel with a number of such adjusting sectors adapted for use in different kinds of fishing; as, for instance, a light brake adjusting sector for such fish as weak fish in which this distance shall be relatively small, and a heavy brake adjusting sector for tarpon fishing in which the distance between these faces shall be relatively great. 53 represents a slidable button and 54 a sliding metal plate adapted to rest directly on the outer face of the head 1, said button being secured by screws 55, 56 and an intermediate connecting pin 57 to a pivoted stop 58 yieldingly held by a spring 59 against a stop pin 60 in the head of the reel, as shown in Fig. 4.

Upon the assumption that the parts of my improved reel are assembled as clearly shown in Figs. 1, 2 and 4 of the drawings, the operation of the same is as follows, referring first to that feature of the invention which is directed to the novel devices for connecting the spool and hence the line carried thereby directly to the driving gear or disconnecting it therefrom, as desired. As shown in Fig. 1 the reel is in position for casting with a free running line and spool, in view of the fact that the male and female parts 14 and 15 are disconnected. This disconnection was effected by forcing the slidable button 24 downward so as to cause the pin 25 to assume its lowest position in the slots 27 and 28 thereby carrying with it the forked arm 38 and causing the inclined faces 35, 35 at the outer inner surfaces thereof to exert a pressure upon the corresponding inclined faces 35, 35 on the upper surface of the yoke 30, the curved part of which yoke forces the pinion 12 from left to right to such an extent as to disengage the male part 14 from the female part 15 in the enlarged head 16 of the sleeve 4, so that said sleeve is absolutely disconnected and the spool free to run without material friction. For connecting the spool, therefore, in operative relation with the driving gear it is only necessary to reverse the movement of the slidable button 24 when the inclined surfaces 35, 35 on the underside of the forked extensions 36 are withdrawn from frictional relation with the vertical movable yoke 30, so that the springs 32, 32 will lift this yoke and hence carry with it the pinion 12 and cause the male part 14 to be automatically connected with the female part 15 of the sleeve 4, so that in the rotation of the crank 21 the reel will impart motion to the line and draw the same in.

Referring now to that portion of the reel which is directed to the braking or drag improvements, when the parts are assembled as shown the proper adjusting sector 47 which it is desired to utilize, dependent on the amount of drag desired, is secured in place by screwing it into the ratchet-wheel 44, the teeth of which, it will be noted on inspection of Fig. 5, are adapted to give a click effect when rotated in one direction against the stop 58, or a checking effect when rotated in the other direction, as will be apparent on inspection of Figs. 4, 5 and 6.

Suppose now a fish is drawing the line from the spool. If no braking effect be desired and it is intended to allow the line to run freely, the slidable button 53 is in the upper position, as shown in Fig. 1. Under this condition all of the parts of the braking mechanism and the pivoted click 45 and click-wheel 46 rotate together freely and no clicking noise is heard. If it be desired to apply the brake after a fish has been hooked, it is only necessary to force the slidable button 53 downward to its limit, under which condition the free or checking end of the stop 58 will come into operative or checking relation with the teeth of the ratchet-wheel 44 and stop the same; consequently, as the fish continues to unreel the line inasmuch as the ratchet-wheel is checked the slidable brake adjusting sector 47 will be advanced from right to left under the influence of the screw-threads between its stem and those of the ratchet-wheel 44, so that pressure will be applied between the outer face of this sector and the inner face of the click wheel 46 which is secured to the shaft 3 by screw-threads 48, thus forcing the ratchet-wheel 44 to the right and increasing the frictional bearing of the inner face thereof against the outer face of the leather disk 42. This increased pressure will continue until the sector has passed through the arc between the checking surfaces 51 and 52, until the checking surface 51 comes into mechanical contact with the pin 50 on the opposite side from that shown in Fig. 6, when all of the parts will move together with the increased frictional relation and the sector will not be further advanced, because it is now held by the friction of the checking surface 51 against the opposite side of the pin 50; consequently, the line will now be withdrawn under the maximum friction for which the adjusting sector 47 is designed.

It will be noted that the light click 45 will always give forth a clicking sound when the stop 58 is in its lower position, no matter in which direction the spool may be rotating, because of the nature of the action of the spring 49 and that the point of the stop 58 acts as a click on the ratchet teeth of the ratchet wheel 44, under the influence of the spring 59, when reeling in only. It will also be apparent that by varying the length of the arc between the checking surfaces 51 and 52 (see Fig. 6) the amount of braking effect may be correspondingly varied, and this feature constitutes one of the most important points of novelty in my invention, in that it adapts my improved reel for use with various kinds of fishing and enables the user to apply any amount of braking friction dependent upon the gamy nature of the fish to be caught.

I do not limit my invention to the especial details of construction disclosed in the accompanying drawings and hereinbefore described, as a number of the features thereof might be materially departed from and still come within the scope of my claims hereinafter.

I make no claim hereinafter broadly to means for effecting a clutching action between the shaft of a spool and the driving gear, as the more generic claims as to this feature are embodied in a parent application bearing Serial No. 517,270, filed Sept. 11th, 1909, and of which the present application is a division.

Having thus described my invention what I claim and desire to secure by Letters Patent of the United States is—

1. In a fishing reel a free running spool provided with a two-part clutch, one part of which is permanently connected with the spool and the other slidably mounted within the head of the reel; in combination with a slidable arm located inside the head of the reel and having an operating button located on the outside thereof; together with a yoke operatively connected with the slidable part of the clutch, the yoke and slidable arm being each provided with oppositely inclined surfaces having a sliding relation to each other, substantially as described.

2. In a fishing reel a free running spool provided with a two-part clutch, one part of which is permanently connected with the spool and the other part slidably mounted within the head of the reel; in combination with a slidable arm located inside the head of the reel and having an operating button located on the outside thereof; together with a yoke operatively connected with the slidable part of the clutch and provided with springs for normally holding the parts of the clutch in operative relation to each other, the yoke and slidable arm being provided with oppositely inclined surfaces having a sliding relation to each other, substantially as described.

3. A fishing reel provided with braking mechanism embracing two braking surfaces both carried by and adapted to rotate with the shaft thereof, one of said parts being rigidly secured thereto and the other part provided with means for advancing it toward and from the first-named part; together with slidable means secured in one of the heads of the reel for checking the second rotatable part and causing it to be advanced toward the first rotatable part, substantially as described.

4. A fishing reel provided with a braking mechanism carried wholly by the shaft thereof and embracing two friction surfaces movable toward and from each other; together with means for effecting such movement, and additional means for applying a maximum braking effect only after the spool has been rotated for a definite time, substantially as described.

In testimony whereof I have signed my name to this specification in the presence of two subscribing witnesses.

JULIUS VOM HOFE.

Witnesses:
C. J. KINTNER,
M. F. KEATING.